United States Patent [19]

Obradovic

[11] Patent Number: 4,977,344
[45] Date of Patent: Dec. 11, 1990

[54] ROTOR ASSEMBLY AND MOTOR CONSTRUCTION

[75] Inventor: Ilija J. Obradovic, Belgrad, Yugoslavia

[73] Assignee: Emerson Electric Co., St. Louis, Mo.

[21] Appl. No.: 452,564

[22] Filed: Dec. 18, 1989

Related U.S. Application Data

[63] Continuation of Ser. No. 7,608, Jan. 28, 1987.

[51] Int. Cl.$^5$ ............................................... H02K 1/06
[52] U.S. Cl. ..................................... 310/217; 310/42; 310/91; 310/218; 310/261; 310/269; 310/270
[58] Field of Search ................... 310/42, 51, 91, 75 R, 310/261, 265, 263, 264, 269, 270, 216, 217, 218, 254, 40 MM, 262; 29/598; 74/573 R; 318/701; 336/210

[56] References Cited

U.S. PATENT DOCUMENTS

| | | | |
|---|---|---|---|
| 538,344 | 4/1895 | Penn et al. | 310/217 U X |
| 1,612,321 | 12/1926 | Soderberg | 310/265 |
| 2,558,737 | 7/1951 | Darnell | 74/573 R |
| 4,642,886 | 2/1987 | Muck et al. | 29/598 |

Primary Examiner—R. Skudy
Attorney, Agent, or Firm—Polster, Polster and Lucchesi

[57] ABSTRACT

A rotor assembly for an electric motor includes a plurality of laminations disposed in a stack, a tension rod extending axially through the rotor lamination stack, and end clamps disposed at each end of the rotor lamiantion stack and secured to the tension rod for compressing the stack to hold the laminations of the stack fixedly in position by compression. A method of stamping rotor and stator laminations for a doubly salient electric motor from a single piece of metal includes the steps of stamping a rotor lamination out of the piece of metal, and stamping the stator lamination out of the piece of metal offset from the stamping of the rotor lamination so that a tooth of the rotor lamiantion stamping is taken from the gap between two teeth of the stator lamination stamping. The centroids of the rotor and stator laminations in their stamped locations in the piece of metal are offset from one another.

2 Claims, 3 Drawing Sheets

ROTOR ASSEMBLY AND MOTOR CONSTRUCTION

This is a continuation of copending application Ser. No. 07/007,608 filed on Jan. 28, 1987.

BACKGROUND OF THE INVENTION

This invention relates to electric motors and more particularly to constructions and methods of construction thereof.

Switched reluctance motors have attracted considerable attention over the past ten to fifteen years, primarily due to the simplicity of their construction and high power densities (ratio between output power and weight). These motors are doubly salient motors, having teeth on both the stator and the rotor, with phase windings only on the stator poles.

Except for very small (below 50 watt) motors, most switched reluctance motors are designed to operate below 2000 RPM because the core losses in switched reluctance motors are several times larger than in conventional machines of the same size. For that reason, conventional wisdom is that switched reluctance motors are best suited for low speed applications. Of course certain applications such as air cooling compressor motors are required to operate at much higher speeds, such as 6000 RPM.

Early switched reluctance motors for larger power levels had six poles on the stator and four on the rotor. To reduce the number of power switches required to supply power to these motors, later designs adopted an 8/4 construction (eight stator poles and four rotor poles), which required fewer power switches and had improved starting torque.

In order to limit the core losses in prior machines, the direction of the stator magneto-motive force (mmf) was selected in such a way that the mmf direction in the rotor changed only once per full rotor revolution. In this way, the high frequency flux changes, which are proportional to the number of rotor poles, appeared only in the stator poles and the edges of the rotor poles. As a result, the core losses in the stator yoke and rotor core were reduced at the expense of some torque imbalance. Of greater concern are the losses in the stator poles due to flux bypass with such a construction. This bypass flux produces a torque in the opposite direction, and the bypass mmf has the opposite direction from the main mmf to be established when the next phase is energized. This change in the mmf direction in the stator poles of prior motors increased the range of flux variation and lead to increased core losses in stator poles.

In addition to the normal losses due to eddy currents and hysteresis, core losses are also affected by the method conventionally used in stamping the rotor and stator laminations. Stamping the laminations for conventional machines is done as follows: First the stator and rotor slots are stamped out and then the rotor lamination is stamped from the stator lamination. As a result, both stator and rotor teeth are sharply rectangular.

Apparently the laminations for switched reluctance motors up to now have been made in the same way. As a result, the stator and rotor poles or teeth have sharp, rectangular corners. Since switched reluctance motors have only one tooth per pole and since they operate on the attraction between teeth/poles, there is a very strong flux concentration at the corners of each pole, prior to and after the alignment of the stator and rotor poles, resulting in increased losses. Rounding of these corners would, on the other hand, appear to require a new method of lamination stamping.

Furthermore, the stamping method presently used on conventional machines requires final machining of the rotor surface, to obtain the exact rotor diameter. This machining normally results in short circuiting of some of the rotor laminations, as does the welding used to hold the laminations together. Although the frequency of the rotor flux in induction machines is low, this manufacturing method and the resulting short-circuiting of laminations causes additional losses which may amount to several percent of the total losses. In switched reluctance motors the machining necessary to obtain the exact rotor diameter would considerably increase the total losses given the frequency change of the rotor flux variations.

Finally, large leakage flux when the rotor is in the position of maximum magnetic reluctance results in flux lines perpendicular to the rotor and stator surfaces Rectangular poles make the flux lines longer, further increasing the losses.

For the above reasons, most of the switched reluctance motors used up to now have high quality laminations, with a thickness of 0.014", which is smaller than in conventional machines. Furthermore, in order to reduce vibrations caused by the strong changes in mmf, present switched reluctance motors have rotor lamination assemblies which are bonded together by adhesives.

Reducing the number of rotor poles is advantageous in designing switched reluctance motors for operation at higher speeds. However with conventional rotor construction, it is not feasible to reduce the number of rotor poles below four. Even with four poles, the flux density (and thus the losses) is high due to the opening in the lamination stack for the motor shaft, which decreases the effective cross-section of the rotor core.

For example, a three-pole rotor in a switched reluctance motor has no room for a conventional shaft if the flux density in the rotor core is to be held at an acceptable level. At the same time, due to the odd number of rotor poles, the radial forces with a three-pole rotor are very large and unbalanced, requiring an even larger shaft than normal. These very strong one-directional radial forces require an exceptionally stiff rotor construction.

SUMMARY OF THE INVENTION

Among the objects and features of the present invention may be noted the provision of a motor with high speed, high horsepower and acceptable core losses.

A second object of the present invention is the provision of an improved lamination stamping method.

A third object of the present invention is the provision of improved stator and rotor laminations with reduced losses.

A fourth object of the present invention is the provision of an improved rotor assembly and motor construction which eliminates the final machining and associated short circuiting of the rotor laminations.

A fifth object of the present invention is the provision of an improved rotor assembly and motor construction that eliminates the need to bond the rotor laminations.

An sixth object of the present invention is the provision of an improved rotor assembly construction which withstands large, unbalanced radial forces.

Other objects and features will be in part apparent and in part pointed out hereinafter.

Briefly, an electric motor of the present invention has a stator with an axial bore therethrough and a rotor mounted for rotation in the bore of the stator. The rotor includes a plurality of laminations disposed in a stack. A tension rod extends axially through the rotor lamination stack and end clamps are disposed at each end of the rotor lamination stack and secured to the tension rod for compressing the stack to hold the laminations of the stack fixedly in position by compression.

A rotor assembly of the present invention for an electric motor having a stator with an axial bore therethrough, the rotor assembly being mountable for rotation in the bore of the stator, includes a plurality of laminations disposed in a stack. A tension rod extends axially through the rotor lamination stack, and end clamps are disposed at each end of the rotor lamination stack and secured to the tension rod for compressing the stack to hold the laminations of the stack fixedly in position by compression.

A method of constructing a rotor assembly of the present invention includes the steps of orienting a plurality of rotor laminations to form a stack. The stack is compressed a sufficient amount so that the stack in use retains its shape against radial forces. An end clamp is fixedly secured on each end of the stack to a tension rod extending through the stack to maintain the compression of the stack.

A method of stamping rotor and stator laminations for a doubly salient electric motor from a single piece of metal, when the rotor laminations have a first number of teeth and the stator laminations have a second, larger number of teeth, includes the steps of: stamping a rotor lamination out of the piece of metal, stamping the stator lamination out of the piece of metal offset from the stamping of the rotor lamination so that a tooth of the rotor lamination stamping is taken from the gap between two teeth of the stator lamination. The centroids of the rotor and stator laminations in their stamped location in the piece of metal are offset from one another.

BRIEF DESCRIPTION OF THE DRAWINGS

Similar reference characters indicate similar parts throughout the several views of the drawings.

DESCRIPTION OF THE PREFERRED EMBODIMENT

Figure 1:
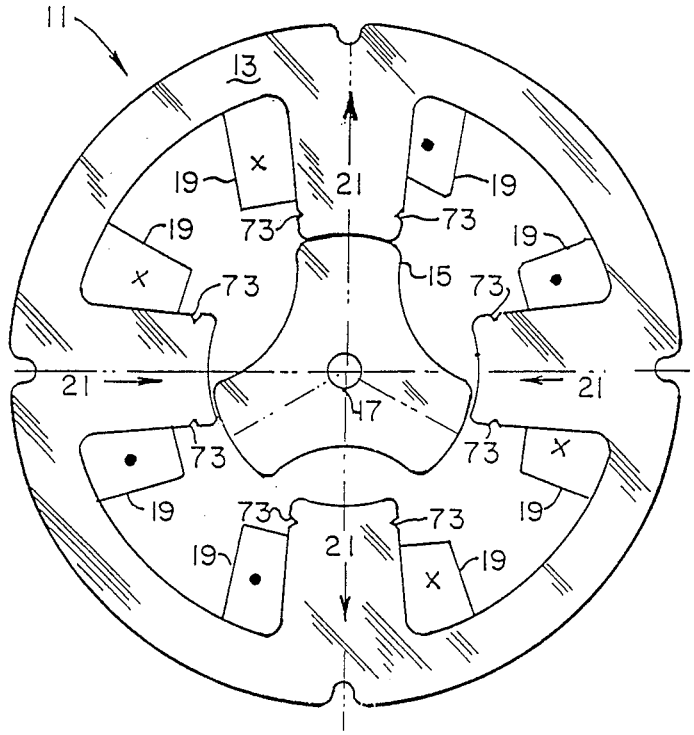
FIG. 1 is a schematic illustration of a motor made in accordance with the present invention.

A motor 11 (FIG. 1) of the present invention (shown as a switched reluctance motor although the present invention is not so limited) includes a four-pole stator 13 whose four teeth extend radially inwardly from the stator yoke to define a central bore in which a three-pole rotor 15 is suitably mounted for rotation. The axis of rotation of rotor 15 is defined by a tension rod 17, as appears below. Phase windings 19 are wound around each tooth or pole of stator 13 with the polarities shown to provide the directions of mmf as indicated by the arrows labelled 21. The teeth of stator 13 are equally spaced about its perimeter and the gaps between the teeth as measured at the central bore of the stator are just slightly larger than the widths of the teeth themselves.

The teeth of rotor 15 are also equally spaced around its perimeter. The width of the teeth of rotor 15 is generally the same as the width of the stator teeth at the central bore, so as to minimize losses. The width of the rotor teeth is also slightly less than the gap between adjacent stator teeth for a reason which will become apparent in connection with the discussion of FIG. 7. It should also be noted that the teeth of both rotor and stator are rounded as illustrated best in FIG. 1 to minimizes flux concentration and losses.

Figure 2:
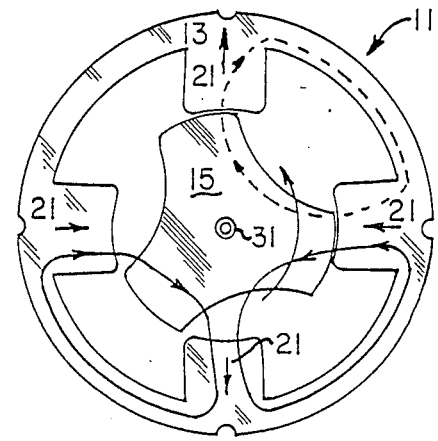
FIG. 2 is a schematic illustration similar to FIG. 1, but on a reduced scale, illustrating the direction of the mmf and the flow of flux i motor of FIG. 1.

In motor 11, as best illustrated in FIG. 2, the flux lines are as short as possible, while the mmf in stator yoke and poles always has the same direction. The mmf's between the phases always add since two of the opposing poles have an mmf towards the rotor center while in the other two the mmf has a direction from the rotor to the stator, as indicated by lines 21. This magnetic circuit allows a substantial reduction in core losses.

Figure 2A:
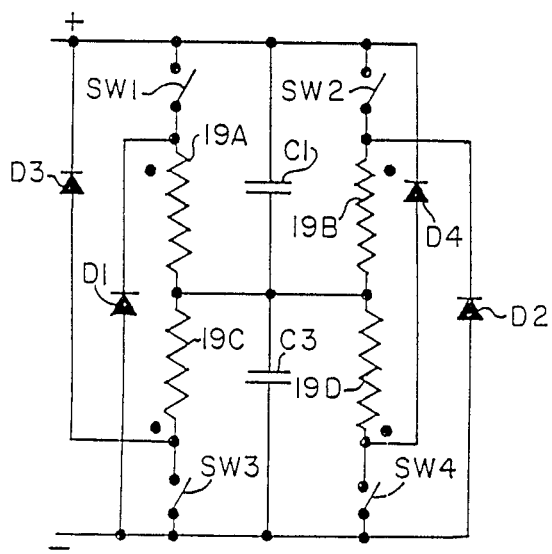
FIG. 2A is an electrical schematic illustrating a converter circuit for the motor of FIG. 1.

The converter circuit for motor 11 is shown in FIG. 2A. The converter takes filtered DC voltage of, for example, 315 volts and through the proper sequential operation of a set of four power transistor switches or the like SW1 through SW4, supplies power to the stator windings 19, here labelled 19A through 19D. The converter includes a pair of capacitors C1 and C3 which perform a voltage dividing function. Each winding has associated therewith a flyback diode D1 through D4 connected between its winding and one of the supply rails.

This converter arrangement has the advantage of being run by only four switching elements, which are controlled in a conventional manner by a control circuit (not shown) to energize their respective phase windings at the proper times. A chopping technique is used for limiting the current values through the windings throughout the full speed range of the motor, which can operate up to and above 6000 RPM.

Rotor 15 has no room for a conventional shaft if the flux density is to be held at acceptable levels in the rotor core. And due to the odd number of rotor poles (three), the unbalanced radial forces exerted on the rotor are very large. Thus, an exceptionally stiff rotor construction is required.

These requirements are achieved by taking a stack 25 (FIGS. 3 and 4) of rotor laminations, stamped to their final outside diameter as described below in connection with FIG. 7, and pressing them together with a pair of identical end clamps 27 and 29. The end clamps are held together by a relatively thin, high quality tension rod 31 through the rotor center. At both ends tension rod 31 is screwed into a larger diameter motor shaft 33 (see FIG. 4). As shown in FIG. 4 motor shaft 33 is composed of two separate segments, motor shaft 33A and motor shaft driving portion 33B. Tension rod 31 is screwed into both segments of the motor shaft as shown. As shown in FIG. 4 at 31A tension rod 31 may be hollow. Moreover, instead of being screwed into the rotor shaft 33, the tension rod may be bonded to the shaft by a suitable adhesive.

Figures 5, 5A:
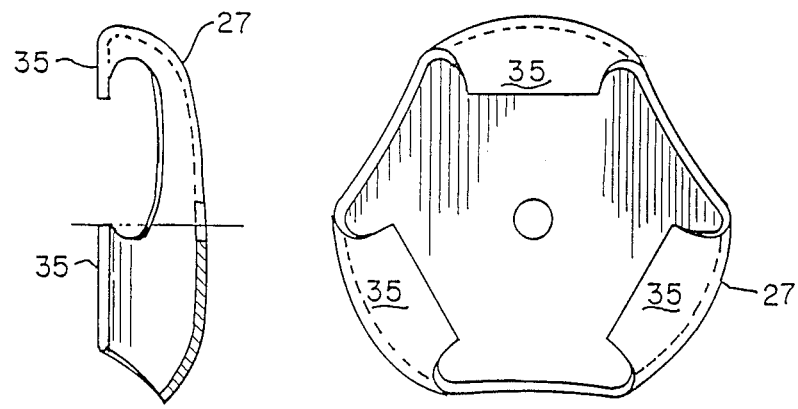
FIG. 5 is a bottom plan of an end clamp used in the motor of FIG. 1.
FIG. 5A is a side elevation, with parts broken away for clarity, of the end clamp of FIG. 5.
Figure 6A:
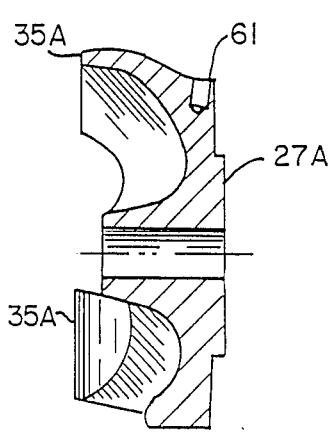
FIG. 6A is a cross-sectional view taken along line 6A—6A of FIG. 6.
Figure 6:
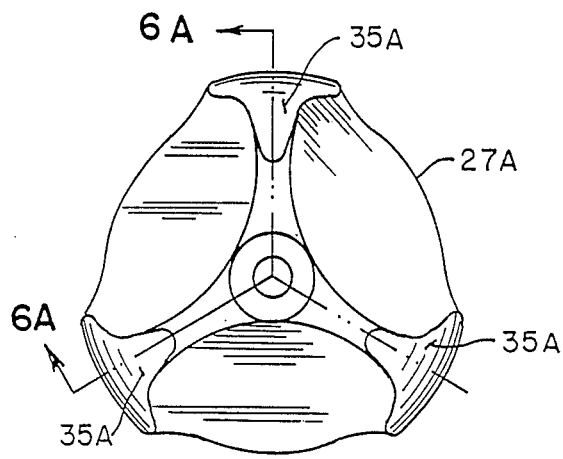
FIG. 6 is a bottom plan of a second embodiment of an end clamp used with the motor of FIG. 1.

The end clamps are made from non-magnetic stainless steel, as shown in FIGS. 5 and 5A, or from cast aluminum, as shown in FIGS. 6 and 6A (the end clamp is labelled 27A in the latter two Figures). Each of the embodiments of end clamp includes three feet 35 and 35A respectively, disposable directly above the teeth of the rotor laminations, for applying pressure to the stack of laminations. The shape or footprint of these feet correspond to the shape of the laminations. The feet extend down below the bodies of the end clamps so that pressure exerted on the clamps is transmitted to the rotor lamination stack. The end clamps need only be elastic enough to assure sufficient axial pressure on the rotor laminations under all rotor temperatures and conditions.

The sequence of rotor assembly is best illustrated in connection with FIG. 3. The tension rod 31 (being threaded at both ends) is first screwed in motor shaft driving portion 33B. A balancing disc 37, end clamp 29, stack 25 of rotor laminations, second end clamp 27, and a second balancing disc 39 are then stacked, one after the other, on the tension rod. The assembly is then temporarily terminated by a nut 41, which represents at the same time the non-driving motor shaft end 33A which will later go into one of a pair of motor bearings 43 (FIG. 4) mounted in a pair of motor end shields 45.

By using a holder 47 (FIG. 3), the assembly is lifted and the other end of tension rod 31 is screwed into a stable support 49. Following that, the rotor laminations are pressed down with three two-pronged tools 51 (only one of which is shown) displaced 120 degrees from each other. The upper prongs 53 of the tools exert the main pressure while the lower prongs 55 merely pushes the laminations so that they follow the movement of the upper end clamp 27.

Figure 3:
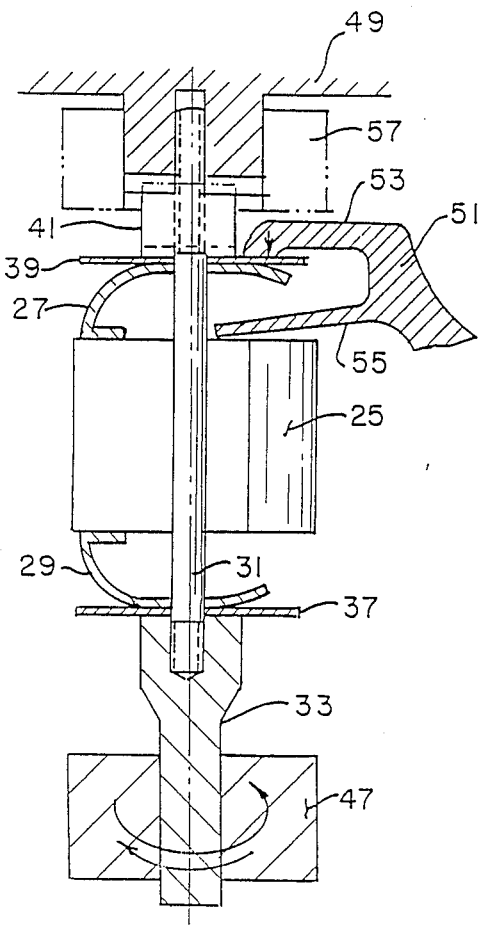
FIG. 3 is a simplified elevation illustrating the construction of the motor of FIG. 1.
Figure 4:
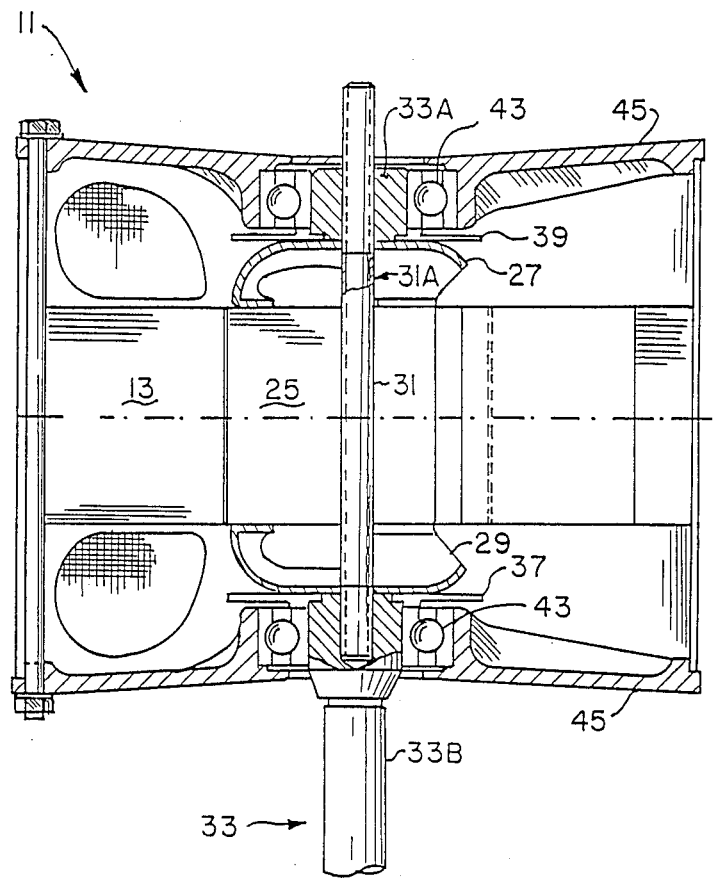
FIG. 4 is an elevation, with parts broken away for clarity, of the motor of FIG. 1.

After the laminations have been sufficiently compressed, a tool 57 tightens nut 41, so that it moves from its original position, shown in dotted lines in FIG. 3 to its final position, shown in solid lines. With this the process of compressing the laminations is completed and the assembly is unscrewed from support 49 by using holder 47.

Before the rotor compression procedure, the two ends or segments 33A and 33B of motor shaft 33 are only drilled and threaded to receive tension rod 31. Their final machining is done only after the compression cycle has been completed. This is done for two reasons. During the compression, the shaft outer surfaces which mate with the shaft bearings may get damaged. Secondly, it is not possible to hold the tolerances during the compression procedure to guarantee rotor shaft concentricity.

The final step in the rotor manufacture consists of rotor balancing. For that purpose, balancing disks 37 and 39 are unitary, with outside diameters somewhat smaller than the rotor outside diameter are used. The balancing is achieved automatically by removing the necessary material from the balancing discs.

Alternatively, if aluminum end clamps 27A of FIGS. 6 and 6A are used, the initial rotor imbalance would be lower than with the end clamps 27 of FIGS. 5 and 5A. In that case, the balancing discs can be omitted altogether from the rotor construction. The fine balancing in that case is done by drilling holes such as hole 61 (FIG. 6A) through the aluminum end clamps as necessary.

Of course, although the above construction has been described in connection with a switched reluctance motor, it should be appreciated that such a construction is not so limited.

Figure 7:
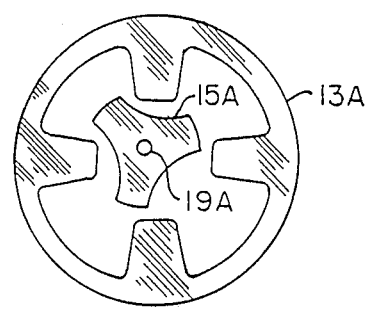
FIG. 7 is a schematic illustration of the stamping pattern for the rotor and stator laminations of the motor of FIG. 1.
Figure 7A:
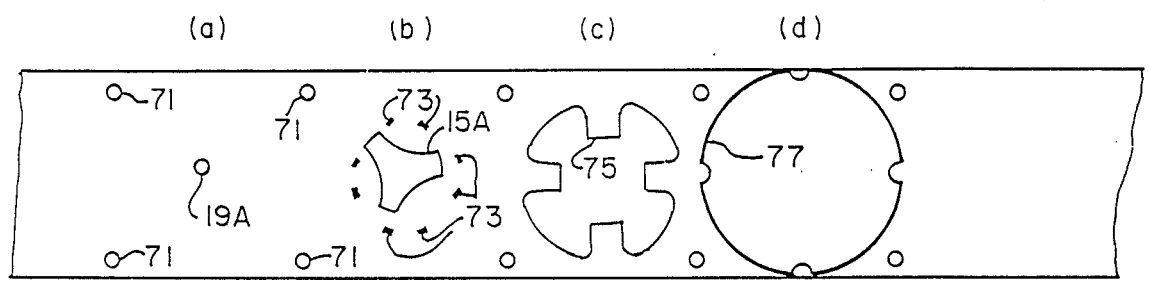
FIG. 7A is a diagrammatic representation of the stamping method by which the rotor and stator laminations of the motor of FIG. 1 are stamped.

The method of stamping the rotor and stator laminations of motor 11 is illustrated in FIGS. 7 and 7A. As indicated in FIG. 7, the stamping for the rotor lamination, labelled 15A and its central bore 19A are off-center with respect to the stamping for the stator lamination 13A. As a result one of the teeth of rotor lamination 15A is taken from the gap between two of the teeth of the stator lamination. (This gap is enlarged in FIG. 7 over that of FIG. 1 for clarity of illustration.) This arrangement, as opposed to the conventional stamping arrangement, allows the rotor and stator teeth to be stamped with rounded corner as best illustrated in FIG. 1.

The four stages, labelled a–d in FIG. 7A, of the stamping of both rotor and stator laminations from a single piece of metal starts with the punching of rotor bore opening 19A in stage a. Note that the rotor bore opening is off-center with respect to placement holes 71. Next the rotor lamination is stamped out along with a series of notches 73, best shown in FIG. 1. In the third stage, the interior configuration 75 of the stator lamination 13A is stamped out. And in the fourth stage the perimeter 77 of the stator lamination is stamped out, resulting in the finished stator lamination.

The methods and constructions described above provide several advantages. For one, they result in a sufficient cross-section in a three-pole rotor to reduce rotor core losses to an acceptable level The three-pole rotor in turn reduces the stator losses by reducing the flux frequency in the stator yoke and poles, while still providing a substantial starting torque. Secondly, the rotor laminations with these methods are stamped to their final outside diameter, thus eliminating the rotor machining used with conventional manufacturing. This in turn eliminates the short circuiting of rotor laminations—another source of core losses. Thirdly, the rotor and stator poles are stamped with rounded poles, thus eliminating the flux concentration in pole corners and reducing further the core losses. Finally, the rotor laminations are compressed so tightly that it is not necessary to apply any anti-vibrating adhesives to the laminations.

In view of the above, it will be seen that the various objects and features of the present invention are achieved and other advantageous results are obtained As various changes could be made in the above constructions and methods without departing from the scope of the invention, it is intended that all matter contained in the above description and shown in the accompanying drawings shall be interpreted as illustrative and not in a limiting sense.

What is claimed is:

1. In an electric motor having a stator with an axial bore therethrough, a rotor having an axis of rotation mounted for rotation about that axis of rotation in the bore of the stator, said rotor comprising a plurality of laminations disposed in a stack, the improvement comprising a tension rod extending axially through the rotor lamination stack and means disposed at each end of the rotor lamination stack and secured to the tension rod for compressing the stack to hold the laminations of the stack fixedly in position by compression, said laminations being unbonded with respect to each other, the compressing means including end clamps disposed at each end of the stack, the laminations having a plurality of teeth, the end clamps having a footprint corresponding to the shape of the laminations.

2. A rotor assembly for an electric motor having a stator with an axial bore therethrough, said rotor assembly having an axis of rotation and being mountable for rotation about said axis of rotation in the bore of the stator, comprising:

a plurality of lamintations disposed in a stack;

a tension rod extending axially through the rotor lamination stack; and means disposed at each end of the rotor lamination stack and secured to the tension rod for compressing the stack to hold the laminations of the stack fixedly in position by compression, said laminations being unbonded with respect to each other;

the compressing means including end clamps disposed at each end of the stack, the laminations having a plurality of teeth, the end clamps having a foot print corresponding to the shape of the laminations.

* * * * *